W. T. & J. C. CODE.
GEARLESS DIFFERENTIAL FOR AUTOMOBILES.
APPLICATION FILED APR. 3, 1917.
1,237,018.
Patented Aug. 14, 1917.
2 SHEETS—SHEET 1.
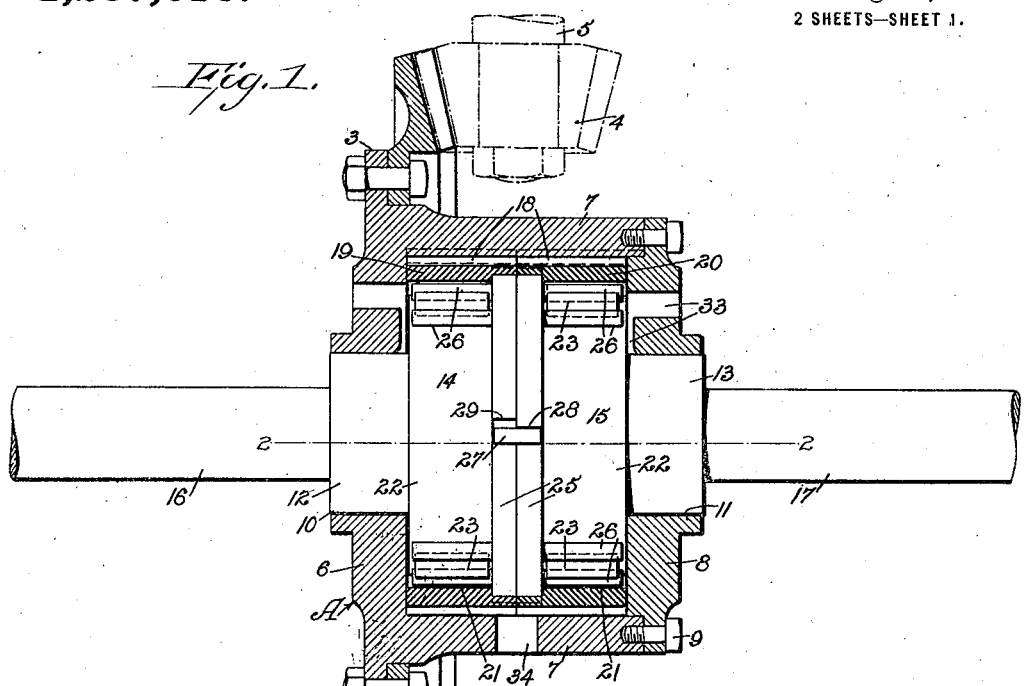
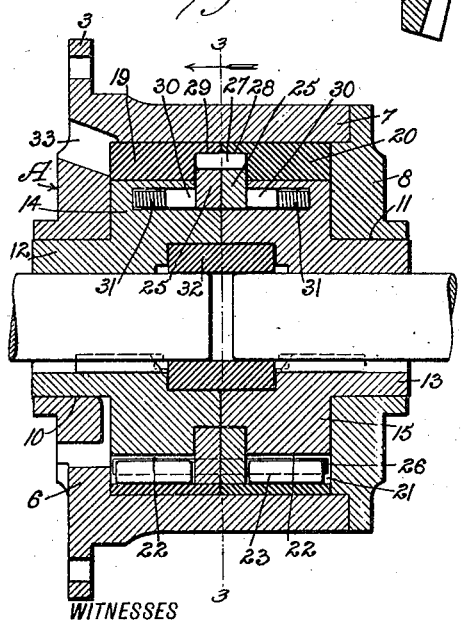
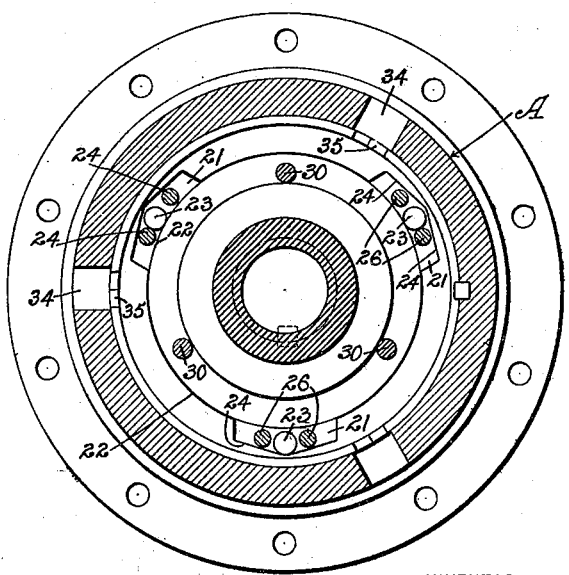
WITNESSES
Oliver W. Holmes
C. Bradway
INVENTORS
W. T. Code
J. C. Code
BY
ATTORNEYS W. T. & J. C. CODE.
GEARLESS DIFFERENTIAL FOR AUTOMOBILES.
APPLICATION FILED APR. 3, 1917.
1,237,018.
Patented Aug. 14, 1917.
2 SHEETS—SHEET 2.
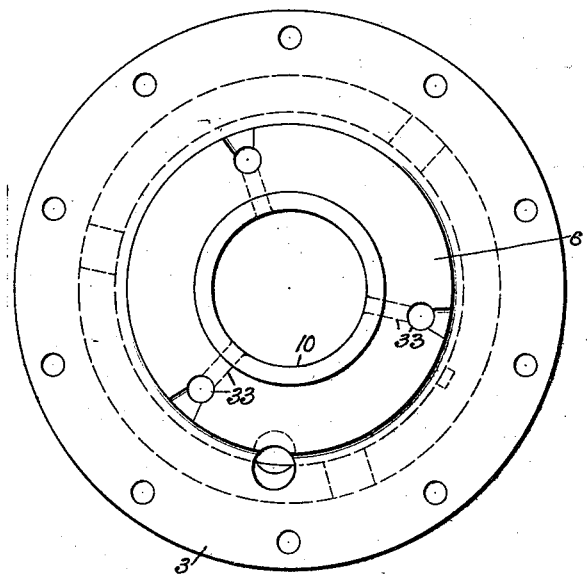
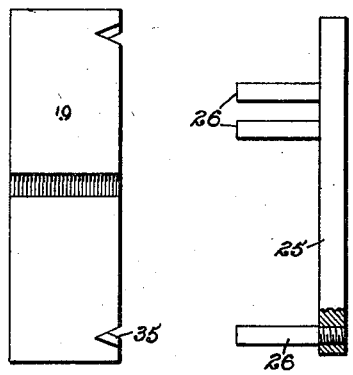
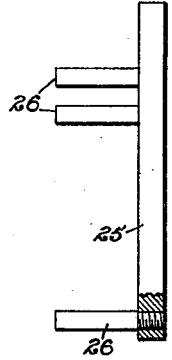
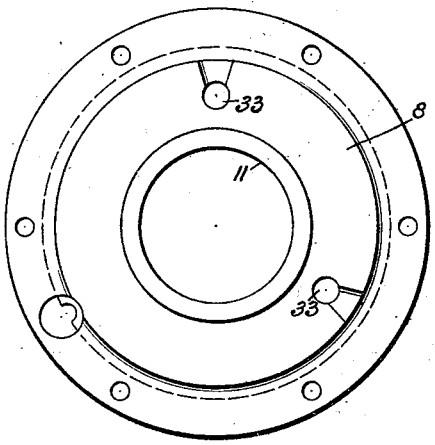
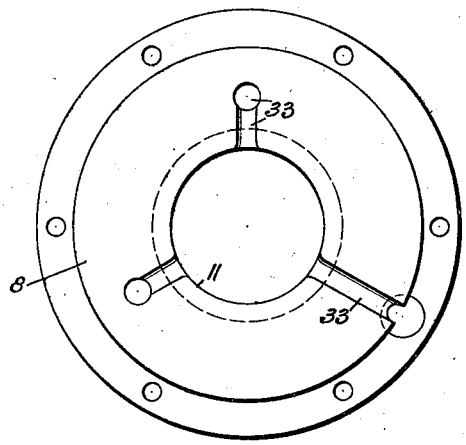
WITNESSES
Oliver W. Holmes
C. Brodway
INVENTORS
W. T. Code
J. C. Code
BY
ATTORNEYS

UNITED STATES PATENT OFFICE.

WILLIAM THOMAS CODE AND JOHN COLEMAN CODE, OF WILLOUGHBY, OHIO.

GEARLESS DIFFERENTIAL FOR AUTOMOBILES.

1,237,018.  Specification of Letters Patent.  Patented Aug. 14, 1917.

Application filed April 3, 1917. Serial No. 159,438.

*To all whom it may concern:*

Be it known that we, WILLIAM T. CODE and JOHN C. CODE, citizens of the United States, and residents of Willoughby, in the county of Lake and State of Ohio, have invented a new and Improved Gearless Differential for Automobiles, of which the following is a full, clear, and exact description.

This invention relates to differential mechanisms and it has for its general object to improve and simplify the construction and operation of devices of this character so as to be reliable and efficient in use, comparatively simple and inexpensive to manufacture, and so designed that gears are entirely dispensed with.

A more specific object of the invention is the provision of a differential mechanism in which the two sections of the divided axle are driven either forwardly or rearwardly by means of roller clutches being wedged in tapering recesses between the driving and the driven elements on the divided axle, there being novel means for unclutching the rollers for permitting a reversal of rotation or for permitting a differential rotation of the parts of the divided axle.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a longitudinal section of the differential mechanism;

Fig. 2 is a longitudinal sectional view on the line 2—2, Fig. 1;

Fig. 3 is a transverse section on the line 3—3 Fig. 2;

Fig. 4 is an end view of the casing;

Fig. 5 is a side view of one of the clutch rings;

Fig. 6 is a side view of one of the cages for shifting or releasing the clutch rollers;

Fig. 7 is a face view of the removable head of the casing;

Fig. 8 is a face view of the inner surface of the head shown in Fig. 7.

Referring to the drawing, A designates the driving element of the differential mechanism, the same being in the form of a drum or casing, which, in the present instance, is provided with a toothed bevel gear ring 1 fastened by bolts 2 to the peripheral flange 3, and meshing with the teeth of the ring is a pinion 4 on the propeller shaft 5. The casing is formed with a head 6 having a circumferential wall 7 integral therewith and at the opposite side is a removable head 8 fastened by bolts 9, the heads having bearing openings 10 and 11, respectively, for hub extensions 12 and 13 on the disks 14 and 15 which are keyed to the sections 16 and 17 respectively of the axle. Surrounding the disks 14 and 15 and fastened to the circumferential wall 7 of the driving element A by keys 18 are clutch rings 19 and 20, respectively. Each of these rings has recesses 21 in its internal surface, and these recesses taper in opposite directions from the center and coöperate with the peripheries 22 of the disks 14 or 15, so that clutch means in the form of rollers 23 can operate between either surface 24 of each recess and the periphery 22 for gripping the driving element A with either or both driven disks 14 and 15. When the driving element is rotated in one direction or the other, the clutch rollers 23 tend to move with it and are thereby wedged into driving engagement with the disks or wheels 14 or 15, and this driving engagement is automatically produced whether the driving element 7 is rotated forwardly or backwardly.

To effect the transfer of the rollers 23 from one side to the other of the central or largest part of their respective recesses 21, roller shifting cages, such as shown in Fig. 6, are employed, there being such a cage for each of the driven disks 14 and 15. Each cage comprises a ring 25 having pairs of pins 26 extending from one side thereof, and parallel with the axis, these pairs being spaced one hundred and twenty degrees around the center, as are the clutch roller-containing recesses 21. A roller 23 is disposed between the pins of each pair, so that the pins 26 shift the rollers toward one end or the other of the recesses 21 in which they are located.

The rings 25 of the two cages are disposed back to back, that is to say, with the pins extending in opposite directions, and the rings 25 have a limited lost motion by means of a key 27 set into recesses 28 and 29 of their peripheries, the recess 29 being wider than the key so as to allow for a limited differential motion of the rings. In the disks 14 and 15 are arranged friction devices in the form of pins or followers 30 backed by springs 31, and these followers 30 frictionally bear against the rings 25 of the roller-shifting devices or cages. As shown in Fig. 2, the inner ends of the axle sections 16 and 17 extend into a bushing 32 which is arranged in counter-bores in the disks 14 and 15. In the heads are arranged suitable oiling passages 33 and in the wall 7 are ports 34 which register with recesses 35 in the rings 19 and 20. It will be understood that the differential mechanism is inclosed in a grease-tight housing and the passages 33 and ports 34 serve for the free flow of grease through the mechanism.

From the foregoing description taken in connection with the accompanying drawing, the advantages of the construction and method of operation will be readily understood by those skilled in the art to which the invention appertains, and while we have described the principle of operation, together with the mechanism which we now consider to be the best embodiment thereof, we desire to have it understood that the mechanism shown is merely illustrative and that such changes may be made when desired as fall within the scope of the appended claims.

Having thus described our invention, we claim as new and desire to secure by Letters Patent:

1. A gearless differential comprising a driving element, a plurality of driven elements therein, there being recesses between the driving and driven elements and each recess tapering in opposite directions from a central point, roller clutch means in the recesses, shifting means for shifting the roller clutch means to one side or the other of the center of the recesses as the direction of rotation of the driving element is reversed, and frictional means between the driven elements and roller-shifting means.

2. A gearless differential comprising a driving element, a plurality of driven elements therein, there being recesses between the driving and driven elements, and the said recesses tapering in opposite directions, clutch rollers in the recesses, roller-shifting cages, means providing a limited lost motion between the cages, and spring-pressed pins on the driven elements frictionally engaging the cages.

3. A gearless differential comprising a driving element, a plurality of driven elements therein, there being recesses between the driving and driven elements, and the said recesses tapering in opposite directions, clutch rollers in the recesses, roller-shifting cages, means providing a limited lost motion between the cages, and frictional means carried by the driven elements and engaging the cages.

WILLIAM THOMAS CODE.
JOHN COLEMAN CODE.

Copies of this patent may be obtained for five cents each, by addressing the "Commissioner of Patents, Washington, D. C."